(12) United States Patent
Miyata et al.

(10) Patent No.: US 6,929,584 B2
(45) Date of Patent: Aug. 16, 2005

(54) HYDRAULIC PRESSURE CONTROL APPARATUS AND METHOD FOR VEHICULAR AUTOMATIC TRANSMISSION

(75) Inventors: Hideki Miyata, Okazaki (JP); Yasuo Hojo, Nagoya (JP); Yoshihiro Iijima, Seto (JP); Naoyuki Fukaya, Okazaki (JP); Haruki Yamamoto, Anjo (JP); Fuminori Suzuki, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/635,573

(22) Filed: Aug. 7, 2003

(65) Prior Publication Data

US 2004/0026155 A1 Feb. 12, 2004

(30) Foreign Application Priority Data

Aug. 9, 2002 (JP) .................................... 2002-232583

(51) Int. Cl.[7] .......................... F16H 61/00; F16H 61/26
(52) U.S. Cl. ..................... 477/119; 477/162; 477/906
(58) Field of Search ................................. 477/130, 157, 477/158, 162, 906; 475/119, 121, 122, 133

(56) References Cited

U.S. PATENT DOCUMENTS

| | | | | | |
|---|---|---|---|---|---|
| 5,738,602 | A | * | 4/1998 | Morita et al. ............... | 475/127 |
| 5,941,794 | A | * | 8/1999 | Jang ............................ | 477/143 |
| 6,319,165 | B1 | * | 11/2001 | Itou et al. .................... | 475/119 |
| 6,432,015 | B1 | * | 8/2002 | Takahashi .................... | 475/116 |
| 6,537,180 | B2 | * | 3/2003 | Kim et al. ................... | 477/130 |
| 6,634,991 | B2 | * | 10/2003 | Itou et al. .................... | 477/156 |
| 2001/0014638 | A1 | * | 8/2001 | Suzuki et al. ............... | 475/119 |

FOREIGN PATENT DOCUMENTS

| | | | | |
|---|---|---|---|---|
| JP | 406207670 A | * | 7/1994 | ................. 477/906 |
| JP | 2000-170899 | | 6/2000 | |
| JP | 2000-240776 | | 9/2000 | |

\* cited by examiner

*Primary Examiner*—Roger Pang
(74) *Attorney, Agent, or Firm*—Oblon, Spivak, McClelland, Maier & Neustadt, P.C.

(57) ABSTRACT

A switching valve is provided which operates hydraulic friction engaging elements in a combination to establish a fifth speed "5th" when in a first position, and in a combination to establish a third speed "3rd" when in a second position, when a first electromagnetic valve to a fifth electromagnetic valve fail so as to stop operating. As a result, in the event of failure while driving, the fifth speed "5th" is first established to enable the vehicle to continue running. Then, when the position of a manual valve is changed by an operation by the driver when the vehicle is stopped or the like, the switching valve shifts a transmission into the third speed "3rd", which has a larger gear ratio than the fifth speed "5th", to ensure the driving force required to take off again.

32 Claims, 5 Drawing Sheets

|  | CL1 | CL2 | B1 | B2 | B3 | F |
|---|---|---|---|---|---|---|
| 1st | ○ |  |  | ◎ |  | ○ |
| 2nd | ○ |  | ○ |  |  |  |
| 3rd | ○ |  |  |  | ○ |  |
| 4th | ○ | ○ |  |  |  |  |
| 5th |  | ○ |  |  | ○ |  |
| 6th |  | ○ | ○ |  |  |  |
| Rev |  |  |  | ○ | ○ |  |

HYDRAULIC PRESSURE CONTROL APPARATUS AND METHOD FOR VEHICULAR AUTOMATIC TRANSMISSION

INCORPORATION BY REFERENCE

The disclosure of Japanese Patent Application No. 2002-232583 filed on Aug. 9, 2002, including the specification, drawings and abstract is incorporated herein by reference in its entirety.

BACKGROUND OF THE INVENTION

1. Field of the Invention

The invention relates to hydraulic pressure control apparatus and method for a vehicular automatic transmission. More particularly, the invention relates to improving failsafe technology which enables the vehicle to run appropriately in the event that transmission state changing means for changing a power transmission state of the automatic transmission fails.

2. Description of the Related Art

A hydraulic pressure control apparatus for a vehicular automatic transmission is known which is provided with a plurality of hydraulic friction engaging devices that are selectively operated for selectively establishing a speed of the automatic transmission, a plurality of electromagnetic control valve devices which change the combination of the plurality of hydraulic friction engaging devices being operated so as to establish an arbitrary speed, and a driving state switching valve that is switched by an operation by a driver so as to switch the driving state of the automatic transmission by supplying hydraulic fluid fed from a hydraulic pump under pressure to a predetermined hydraulic fluid path. With this hydraulic pressure control apparatus, multiple speed shifting in, for example, six forward speeds is possible by the plurality of electromagnetic control valve (i.e., shift valve) devices each controlled by a separate solenoid, for example. Normally automatic transmissions are provided with a predetermined electronic control unit (ECU) that electrically controls the plurality of individual solenoids and the like. The ECU, the plurality of individual solenoids, and the plurality of electromagnetic control valve devices and the like constitute the transmission state changing means.

It is conceivable, however, that this transmission state changing means may, for one reason or another, stop working, or in other words, fail. In view of this possibility of failure, it is necessary to introduce failsafe technology into the design of the apparatus. Particularly, it is necessary to have the vehicle be able to continue driving if a failure occurs while driving. These needs have led to the proposal of failsafe means for enabling a vehicle to run appropriately even if the transmission state changing means fails. One such proposal is a hydraulic pressure control apparatus for an automatic transmission disclosed in Japanese Patent Laid-Open Publication No. 2000-170899. The hydraulic pressure control apparatus of that publication is provided with a plurality of friction engaging elements, a plurality of hydraulic servos that engage and disengage those friction engaging elements according to supply or drain of hydraulic fluid, a solenoid valve which generates a predetermined hydraulic pressure and supplies that predetermined hydraulic pressure to one or more of the hydraulic servos selected in accordance with a speed to be established, and failsafe means which supplies hydraulic pressure for the failsafe to at least two of the selected hydraulic servos to establish an arbitrary speed when a failure has occurred in the solenoid valve such that power is unable to be transmitted. As a result, in the event that a failure occurs while driving, at least two hydraulic servos are selected to establish an arbitrary speed. Hydraulic pressure for the failsafe is then supplied to each of these hydraulic servos so as to enable the vehicle to continue running.

However, a vehicle not provided with a low speed range, i.e., "3," "2" or "L", such as a sequential shift vehicle (i.e., a type of vehicle that runs forward only when in the "D" range where shifting is performed by electric means), may have not be able to obtain the necessary driving force while in a high speed and may therefore have difficulty taking off when attempting to take off again after stopping the vehicle when the failsafe means is functioning.

SUMMARY OF THE INVENTION

The invention thus provides hydraulic pressure control apparatus and method for a vehicular automatic transmission which enables the vehicle to run appropriately when a relatively large driving force is required while failsafe means is functioning.

A first aspect of the invention relates to an apparatus for controlling hydraulic pressure in a vehicular automatic transmission which includes a plurality of hydraulic friction engaging devices which are selectively operated to selectively establish a speed of the automatic transmission; a plurality of electromagnetic control valve devices which change a combination of the plurality of hydraulic friction engaging devices being operated so as to selectively establish a first predetermined speed and a second predetermined speed; and a driving state switching valve switched by an operation by a driver, which switches a driving state of the automatic transmission by supplying an hydraulic fluid fed under pressure from a hydraulic pump to a predetermined hydraulic fluid path; and which further includes a switching valve which is switched from a first position to a second position in accordance with a change in a position of the driving state switching valve when the plurality of electromagnetic control valve devices stop working, the switching valve operating the hydraulic friction engaging devices in a combination to establish the first predetermined speed when in the first position, and in a combination to establish the second predetermined speed when in the second position.

According to this construction, by providing the switching valve, in the event that a failure occurs while driving, the first predetermined speed is first established such that the vehicle can continue to run. Then, in accordance with a change in the position of the driving state switching valve by an operation by the driver when the vehicle is stopped or the like, the switching valve switches the transmission into the second predetermined speed, which has a larger gear ratio than the first predetermined speed, thereby ensuring the driving force required to take off again. That is, it is possible to provide an apparatus for controlling hydraulic pressure in a vehicular automatic transmission which enables the vehicle to run appropriately when a relatively large driving force is required while the failsafe means is functioning.

In this case, it is preferable that the switching valve be able to be switched from the first position to the second position when hydraulic pressure for driving the vehicle forward is interrupted due to a change in the position of the driving state switching valve. According to this construction, by changing the position of the driving state switching valve from the "D" position to the "N" position, for example, when the vehicle is stopped or the like, the transmission is switched from the first predetermined speed to the second predetermined speed so that appropriate running is possible in the second predetermined speed.

Further, it is also preferable that the switching valve be able to be switched from the first position to the second position when hydraulic pressure for driving the vehicle in reverse is output due to a change in the position of the driving state switching valve. According to this construction, the transmission is switched from the first predetermined speed to the second predetermined speed by changing the position of the driving state switching valve from the "D" position to the "R" position, for example, when the vehicle is stopped or the like, thus enabling the vehicle to run appropriately in the second predetermined speed.

Also, it is preferable that the hydraulic friction engaging devices include a first clutch, a second clutch, a first brake, a second brake, and a third brake; the first predetermined speed is established by engaging the second clutch and the third brake in combination, and the second predetermined speed is established by engaging the first clutch and the third brake in combination; the plurality of electromagnetic control valve devices include a normally closed type first clutch control valve, a normally open type second clutch control valve, a normally closed type first brake control valve, a normally closed type second brake control valve, and a normally open type third brake control valve; the driving state switching valve prohibit output of hydraulic pressure when a shift lever is shifted to an N position and allow the output of a D range hydraulic pressure when the shift lever is shifted to a D position; and the switching valve be able to switch the output of the D range hydraulic pressure so as to engage the second clutch when in the first position, and so as to engage the first clutch when in the second position. According to this construction, in the event that a failure occurs and the plurality of the electromagnetic control valve devices stop working, the first predetermined speed is established by engaging the second clutch and the third clutch which are operated by the normally open type second clutch control valve and third brake control valve, respectively. Then when the position of the driving state switching valve is changed from the "D" position to the "N" position, for example, by an operation by the driver when the vehicle is stopped or the like, the switching valve switches the output of the D range hydraulic pressure so as to release the second clutch while engaging the first clutch, thereby establishing the second predetermined speed.

A second aspect of the invention relates to an apparatus for controlling hydraulic pressure in vehicular automatic transmission which includes a plurality of hydraulic friction engaging devices which are selectively operated to selectively establish a speed of the automatic transmission; a plurality of electromagnetic control valve devices which change a combination of the plurality of hydraulic friction engaging devices being operated so as to selectively establish a first predetermined speed and a second predetermined speed; and a driving state switching valve which switches a driving state of the automatic transmission by supplying hydraulic fluid fed under pressure from a hydraulic pump by operation of an engine to a predetermined hydraulic fluid path; and which further includes a switching valve which is switched from a first position to a second position in accordance with a change in an operating state of the hydraulic pump when the plurality of electromagnetic control valve devices stop working, the switching valve operating the hydraulic friction engaging devices in a combination to establish the first predetermined speed when in the first position, and in a combination to establish the second predetermined speed when in the second position.

According to this construction, by providing the switching valve, in the event that a failure occurs while driving, the first predetermined speed is first established so that the vehicle is able to continue running. Then, when operation of the hydraulic pump is stopped due to operation of the engine being stopped, such as when the vehicle is stopped, the switching valve switches the transmission into the second predetermined speed, which has a larger gear ratio than the first predetermined speed, thereby ensuring the driving force required to take off again. That is, it is possible to provide an apparatus for controlling hydraulic pressure in a vehicular automatic transmission which enables the vehicle to run appropriately when a relatively large driving force is required while the failsafe means is functioning.

In this case, it is preferable that the switching valve be able to be switched from the first position to the second position when a line hydraulic pressure stops being output due to operation of the hydraulic pump stopping. According to this construction, the transmission is switched from the first predetermined speed to the second predetermined speed by, for example, restarting the engine after it has been stopped such as when the vehicle has been stopped, thereby enabling the vehicle to run appropriately in the second predetermined speed.

Further, it is preferable that the switching valve be able to be switched from the first position to the second position also according to a change in the position of the driving state switching valve. According to this construction, the transmission is switched from the first predetermined speed to the second predetermined speed also by changing the position of the driving state switching valve to a position other than the "D" position, for example, when the vehicle is stopped or the like, thereby enabling the vehicle to run appropriately in the second predetermined speed.

Also, it is preferable that the hydraulic friction engaging devices include a first clutch, a second clutch, a first brake, a second brake, and a third brake; the first predetermined speed is established by engaging the second clutch and the third brake in combination, and the second predetermined speed is established by engaging the first clutch and the third brake in combination; the plurality of electromagnetic control valve devices include a normally closed type first clutch control valve, a normally open type second clutch control valve, a normally closed type first brake control valve, a normally closed type second brake control valve, and a normally open type third brake control valve; the driving state switching valve prohibit output of hydraulic pressure when a shift lever is shifted to an N position and allow the output of a D range hydraulic pressure when the shift lever is shifted to a D position; and the switching valve be able to switch the output of the D range hydraulic pressure so as to engage the second clutch when in the first position, and so as to engage the first clutch when in the second position. According to this construction, in the event that a failure occurs and the plurality of the electromagnetic control valve devices stop working, the first predetermined speed is first established by engaging the second clutch and the third clutch which are operated by the normally open type second clutch control valve and third brake control valve, respectively. Then when the vehicle is restarted or the like after having been stopped, such as when the vehicle has been stopped or the like, the switching valve switches the output of the D range hydraulic pressure so as to release the second clutch while engaging the first clutch, thereby establishing the second predetermined speed.

A third aspect of the invention relates to a hydraulic pressure control method for an automatic transmission for a vehicle, including a plurality of hydraulic friction engaging devices which are selectively operated to selectively establish a speed of the automatic transmission, a plurality of electromagnetic control valve devices which change a combination of the plurality of hydraulic friction engaging devices being operated so as to selectively establish a first predetermined speed and a second predetermined speed, a driving state switching valve switched by an operation by a driver, which switches a driving state of the automatic transmission by supplying a hydraulic fluid fed under pressure from a hydraulic pump to a predetermined hydraulic fluid path, and a switching valve which operates the hydraulic friction engaging devices. This method comprises the steps of: switching the switching valve from a first position to a second position according to a change in a position of the driving state switching valve when the plurality of electromagnetic control valve devices stop working; and operating the hydraulic friction engaging devices in a combination to establish the first predetermined speed when in the first position, and in a combination to establish the second predetermined speed when in the second position.

A fourth aspect of the invention relates to a hydraulic pressure control method for an automatic transmission for a vehicle, including a plurality of hydraulic friction engaging devices which are selectively operated to selectively establish a speed of the automatic transmission, a plurality of electromagnetic control valve devices which change a combination of the plurality of hydraulic friction engaging devices being operated so as to selectively establish a first predetermined speed and a second predetermined speed by, a driving state switching valve which switches a driving state of the automatic transmission by supplying an hydraulic fluid fed under pressure from a hydraulic pump by operation of an engine to a predetermined hydraulic fluid path, and a switching valve which operates the hydraulic friction engaging devices. This method comprises the steps of: switching the switching valve from a first position to a second position according to a change in an operating state of the hydraulic pump when the plurality of electromagnetic control valve devices stop working; and operating the hydraulic friction engaging devices in a combination to establish the first predetermined speed when in the first position, and in a combination to establish the second predetermined speed when in the second position.

DETAILED DESCRIPTION OF THE PREFERRED EMBODIMENTS

Hereinafter, preferred embodiments of the invention will be described in detail based on the drawings.

Figures 1, 2:
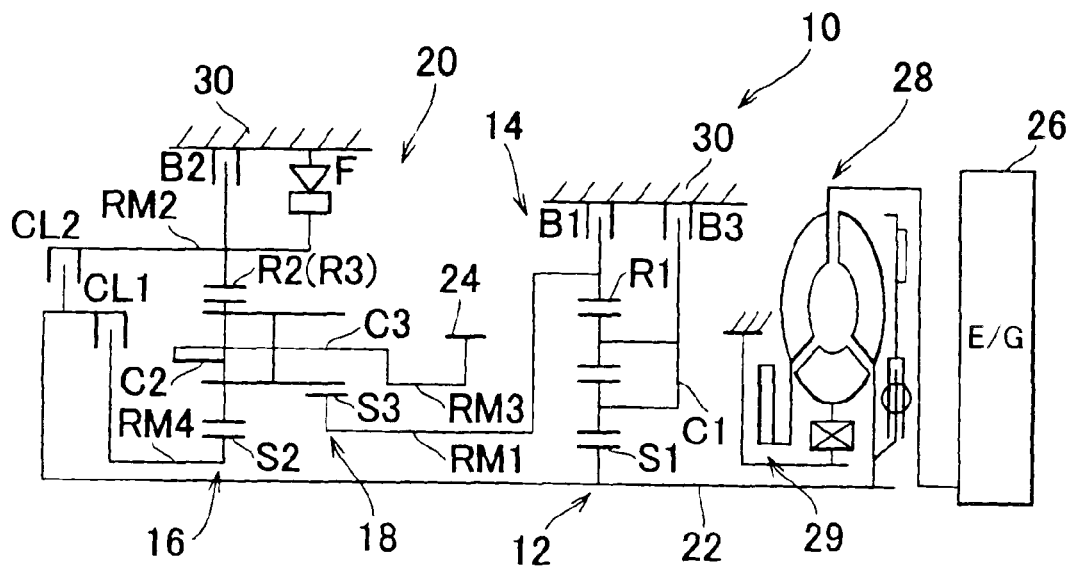
FIG. 1 is a skeleton view showing the construction of a vehicular automatic transmission to which an apparatus for controlling hydraulic pressure of the invention has been applied.
FIG. 2 is a clutch application chart showing the relationships between the speeds of the automatic transmission and the operating states of the engaging elements in the automatic transmission shown in FIG. 1.

FIG. 1 is a skeleton view of a vehicular automatic transmission (hereinafter simply referred to as "transmission") 10 to which a hydraulic pressure control apparatus according to a first exemplary embodiment of the invention has been applied. The transmission 10 is a transversely mounted transmission for use in an FF (i.e., front engine, front-wheel drive) vehicle or the like, and includes a first transmitting portion 14 and a second transmitting portion 20 on the same axis. The first transmitting portion 14 includes a double pinion type first planetary gearset 12 as its main component, while the second transmitting portion 20 includes a single pinion type second planetary gearset 16 and a double pinion type third planetary gearset 18 as its main components. The transmission 10 takes the rotation from the input shaft 22, changes it, and outputs the changed rotation to an output gear 24. The input shaft 22 corresponds to an input member such as a turbine shaft of a torque converter 28 driven by an engine 26 which serves as a driving source for running the vehicle. The output gear 24 drives left and right driven wheels via a differential gear unit, not shown. Also, a hydraulic pump 29 with an impeller formed integrally thereto is provided with the torque converter 28. This hydraulic pump 29 is interlocked with the engine 26 and feeds hydraulic fluid under a predetermined pressure to a hydraulic pressure control circuit 80, which will be described later. The hydraulic fluid sent from the hydraulic pump 29 is both supplied to a lock-up clutch of the torque converter 28 and used to lubricate various parts of the transmission 10. Because the transmission 10 is substantially symmetrical with respect to its center line or axis, the half below the center line has been omitted in FIG. 1.

The first planetary gearset 12, which largely makes up the first transmitting portion 14, includes three rotating elements, which are a sun gear S1, a carrier C1, and a ring gear R1. The sun gear S1 is connected to, and driven by, the input shaft 22, while the carrier C1 is fixed via a third brake B3 to a case 30 which does not rotate. The ring gear R1 functions as an intermediate output member, outputting power while rotating at a slower speed than the input shaft 22. Further, the second planetary gearset 16 and the third planetary gearset 18, which together largely make up the second transmitting portion 20, are coupled together at four portions which serve as four rotating elements RM1 to RM4. More specifically, a sun gear S3 of the third planetary gearset 18 serves as the first rotating element RM1; a ring gear R2 of the second planetary gearset 16 and a ring gear R3 of the third planetary gearset 18 are coupled together and serve as the second rotating element RM2; a carrier C2 of the second planetary gearset 16 and a carrier C3 of the third planetary gearset 18 are coupled together and serve as the third rotating element RM3; and a sun gear S2 of the second planetary gearset 16 serves as the fourth rotating element RM4. The second planetary gearset 16 and the third planetary gearset 18 together form a Ravigneaux type planetary gear train, in which the carriers C2 and C3, as well as the ring gears R2 and R3, are shared as common members, and the pinion gear of the second planetary gearset 16 also serves as the second pinion gear of the third planetary gearset 18.

The first rotating element RM1 (i.e., the sun gear S3) can be selectively prevented from rotating by coupling it to the case 30 by a first brake B1. The second rotating element RM2 (i.e., the ring gears R2 and R3) may be selectively coupled to the input shaft 22 by a second clutch CL2 and selectively prevented from rotating by coupling it to the case 30 with a second brake B2. The fourth rotating element RM4 (i.e., the sun gear S2) can be selectively coupled to the input shaft 22 via a first clutch CL1. The first rotating element RM1 (i.e., the sun gear S3) is integrally connected to the ring gear R1 of the first planetary gearset 12, which serves as the intermediate output member. The third rotating element RM3 (i.e., the carriers C2 and C3) is integrally connected to the output gear 24 and outputs rotation thereto. The first brake B1, second brake B2, third brake B3, first clutch CL1, and second clutch CL2 together serve as a multiple-disc hydraulic friction engaging device in which they are all frictionally engaged by a hydraulic cylinder. Along with the second brake B2, a one-way clutch F, which allows forward rotation of the second rotating element RM2 (i.e., rotation in the same direction as that of the input shaft 22) while preventing reverse rotation, is also provided between the second rotating element RM2 and the case 30.

The clutch application chart in FIG. 2 shows the relationships between the speeds of the transmission 10 and the operating states of the first clutch CL1, the second clutch CL2, the first brake B1, the second brake B2, and the third brake B3. The single circle denotes engagement and the double circle denotes engagement only with engine braking. Because the one-way clutch F is provided along with the second brake B2 used to establish the first speed "1st", it is not always necessary to engage the second brake B2 when taking off (i.e., when accelerating). Also, the gear ratio for each speed is set appropriately according to the gear ratios of the first planetary gearset 12, the second planetary gearset 16, and the third planetary gearset 18.

That is, when the first clutch CL1 and the second brake B2 are engaged, such that the fourth rotating element RM4 rotates integrally with the input shaft 22 and the second rotating element RM2 is kept from rotating, the third rotating element RM3 coupled to the output gear 24 rotates at a rotational speed denoted by "1st" and a first speed "1st", which has the largest gear ratio, is established. When the first clutch CL1 and the first brake B1 are engaged, such that the fourth rotating element RM4 rotates integrally with the input shaft 22 and the first rotating element RM1 is kept from rotating, the third rotating element RM3 rotates at a rotational speed denoted by "2nd" and a second speed "2nd", which has a gear ratio smaller than that of the first speed "1st", is established. When the first clutch CL1 and the third brake B3 are engaged, such that the fourth rotating element RM4 rotates integrally with the input shaft 22 and the first rotating element RM1 rotates via the first transmitting portion 14 at a slower speed than the input shaft 22, the third rotating element RM3 rotates at a rotational speed denoted by "3rd" and a third speed "3rd", which has a gear ratio smaller than that of the second speed "2nd", is established. When the first clutch CL1 and the second clutch CL2 are engaged, such that the second transmitting portion 20 rotates integrally with the input shaft 22, the third rotating element RM3 rotates at a rotational speed denoted by "4th", i.e., the third rotating element RM3 is rotated at the same speed as the input shaft 22, and a fourth speed "4th", which has a gear ratio smaller than that of the third speed "3rd", is established. This fourth speed "4th" has a gear ratio of 1:1. When the second clutch CL2 and the third brake B3 are engaged, such that the second rotating element RM2 rotates integrally with the input shaft 22 and the first rotating element RM1 rotates via the first transmitting portion 14 at a slower speed than the input shaft 22, the third rotating element RM3 rotates at a rotational speed denoted by "5th" and a fifth speed "5th", which has a gear ratio smaller than that of the fourth speed "4th", is established. When the second clutch CL1 and the first brake B1 are engaged, such that the second rotating element RM2 rotates integrally with the input shaft 22 and the first rotating element RM1 is kept from rotating, the third rotating element RM3 rotates at a rotational speed denoted by "6th" and a sixth speed "6th", which has a gear ratio smaller than that of the fifth speed "5th", is established. Further, when the second brake B2 and the third brake B3 are engaged, such that the second rotating element RM2 is kept from rotating and the first rotating element RM1 rotates via the first transmitting portion 14 at a slower speed than the input shaft 22, the third rotating element RM3 rotates in reverse at a rotational speed denoted by "Rev" and a reverse speed "Rev" is established.

Figure 3:
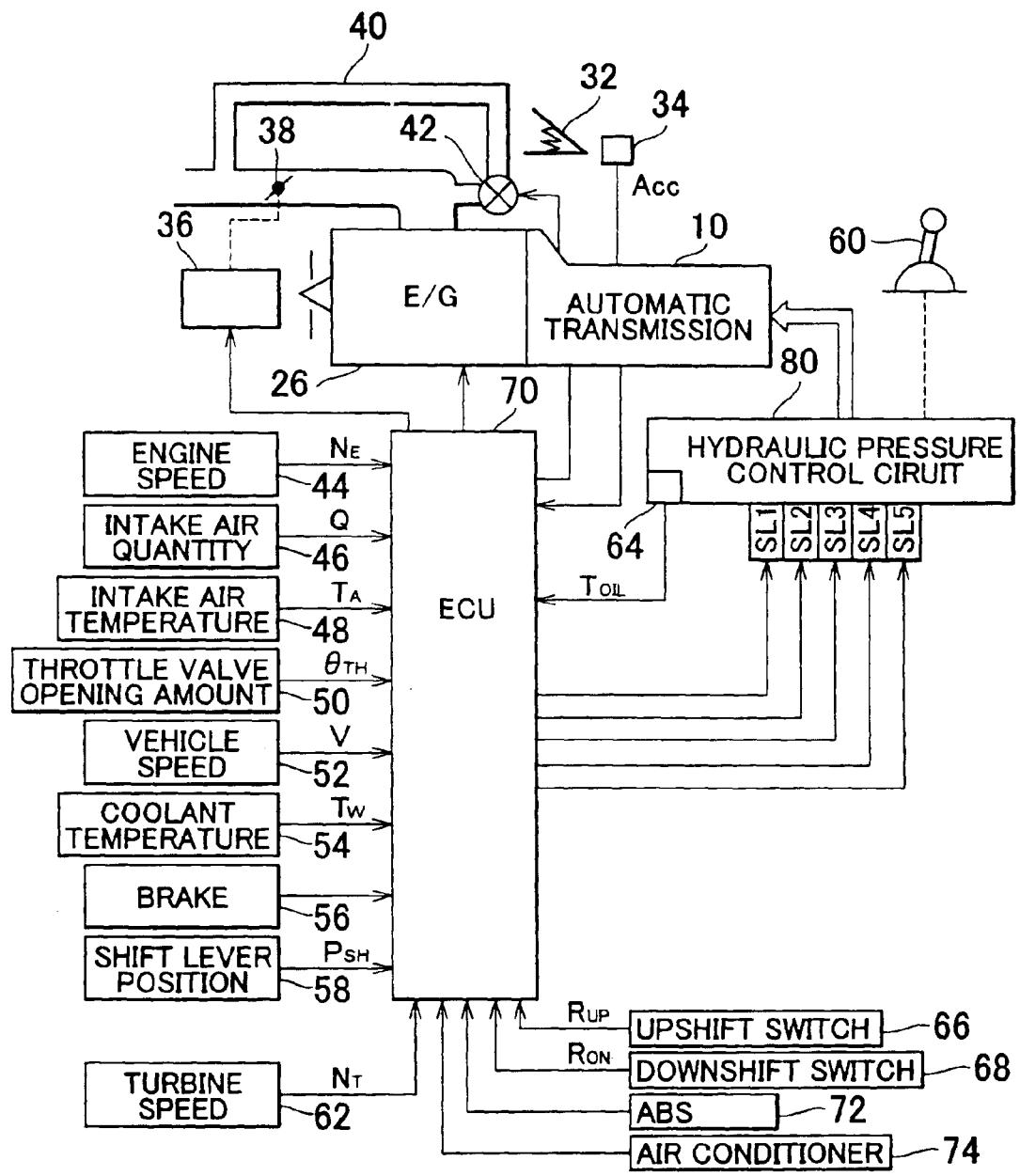
FIG. 3 is a block diagram for explaining the main components of a control system in the automatic transmission shown in FIG. 1.

FIG. 3 is a block diagram for explaining the control system provided in the vehicle for controlling the transmission 10, the engine 26, and the like. As is evident from this drawing, an operation amount ACC of an accelerator pedal 32 that is depressed by the driver is detected by an accelerator operation amount sensor 34. Also, an electronic throttle valve 38 which is operated by a throttle actuator 36 to have an opening angle (opening amount) $\theta_{TH}$ that is fundamentally in accordance with the accelerator pedal operation amount ACC is provided an intake pipe of the engine 26. Further, an ISC valve (idle speed control valve) 42 is provided in parallel with the electronic throttle valve 38 to control the idle speed in a bypass passage 40 that bypasses the electronic throttle valve 38. This ISC valve 42 controls the intake air quantity when the electronic throttle valve 38 is fully closed in order to control an idle speed $NE_{IDL}$ of the engine 26. In addition, various sensors and switches are provided, which include an engine speed sensor 44 for detecting an engine speed $N_E$ of the engine 26, an intake air quantity sensor 46 for detecting an intake air quantity Q of the engine 26, an intake air temperature sensor 48 for detecting a temperature $T_A$ of the intake air, a throttle sensor 50 with an idle switch for detecting a fully closed state (i.e., an idle state) of the electronic throttle valve 38 and the opening amount $\theta_{TH}$ thereof, a vehicle speed sensor 52 for detecting a vehicle speed V (which corresponds to a rotation speed $N_{OUT}$ of the output shaft), a coolant temperature sensor 54 for detecting a coolant temperature $T_W$ of the engine 26, a brake switch 56 for detecting operation of a foot brake, which is the main brake, a lever position sensor 58 for detecting a lever position (operating position) $P_{SH}$ of a shift lever 60, a turbine rotation speed sensor 62 for detecting a turbine rotation speed $N_T$ (=a rotation speed $N_{IN}$ of the input shaft 22), an AT fluid temperature sensor 64 for detecting an AT fluid temperature $T_{OIL}$ which is the temperature of the hydraulic fluid within a hydraulic pressure control circuit 80, which will be described later, an upshift switch 66, and a downshift switch 68. Signals from these sensors and switches indicative of the engine speed $N_E$, intake air quantity Q, intake air temperature $T_A$, throttle valve opening amount $\theta_{TH}$, vehicle speed V, engine coolant temperature $T_W$, a brake operation, lever position $P_{SH}$ of the shift lever 60, turbine rotation speed $N_T$, AT fluid temperature $T_{OIL}$, a shift range up command $R_{UP}$, a shift range down command $R_{DN}$, and the like are supplied to an electronic control unit (ECU) 70. Further, ABS (anti-lock brake system) 72, which controls the braking force so that the wheels will not lockup (slip) when the foot brake is operated, is also connected to the ECU 70. Information such as that relating to brake pressure corresponding to the braking force, as well as a signal indicative of whether an air conditioner 74 is being operated, are also sent to the ECU 70.

The shift lever 60 is arranged near the driver's seat. When the position of this shift lever 60 is changed by a manual operation by the driver, the shift lever 60 changes the position of a manual valve 82, which is a driving state switching valve that switches the driving state of the transmission 10, by supplying hydraulic fluid fed from the hydraulic pump 29 to a predetermined hydraulic fluid path. For example, the shift lever 60 can be selectively operated to a "P" (park) position to park the vehicle, an "R" (reverse) position to move the vehicle in reverse, an "N" (neutral) position to interrupt the transmission of power, or a "D" (drive) position to move the vehicle forward. When the shift lever 60 is in the "R" position, a reverse circuit is mechanically established such that the reverse speed "Rev" is established. When the shift lever 60 is in the "N" position, a neutral circuit is mechanically established whereby all of the hydraulic friction engaging devices, i.e., the first clutch CL1, the second clutch CL2, and the first through the third brakes B1 to B3, are disengaged.

Figure 4:
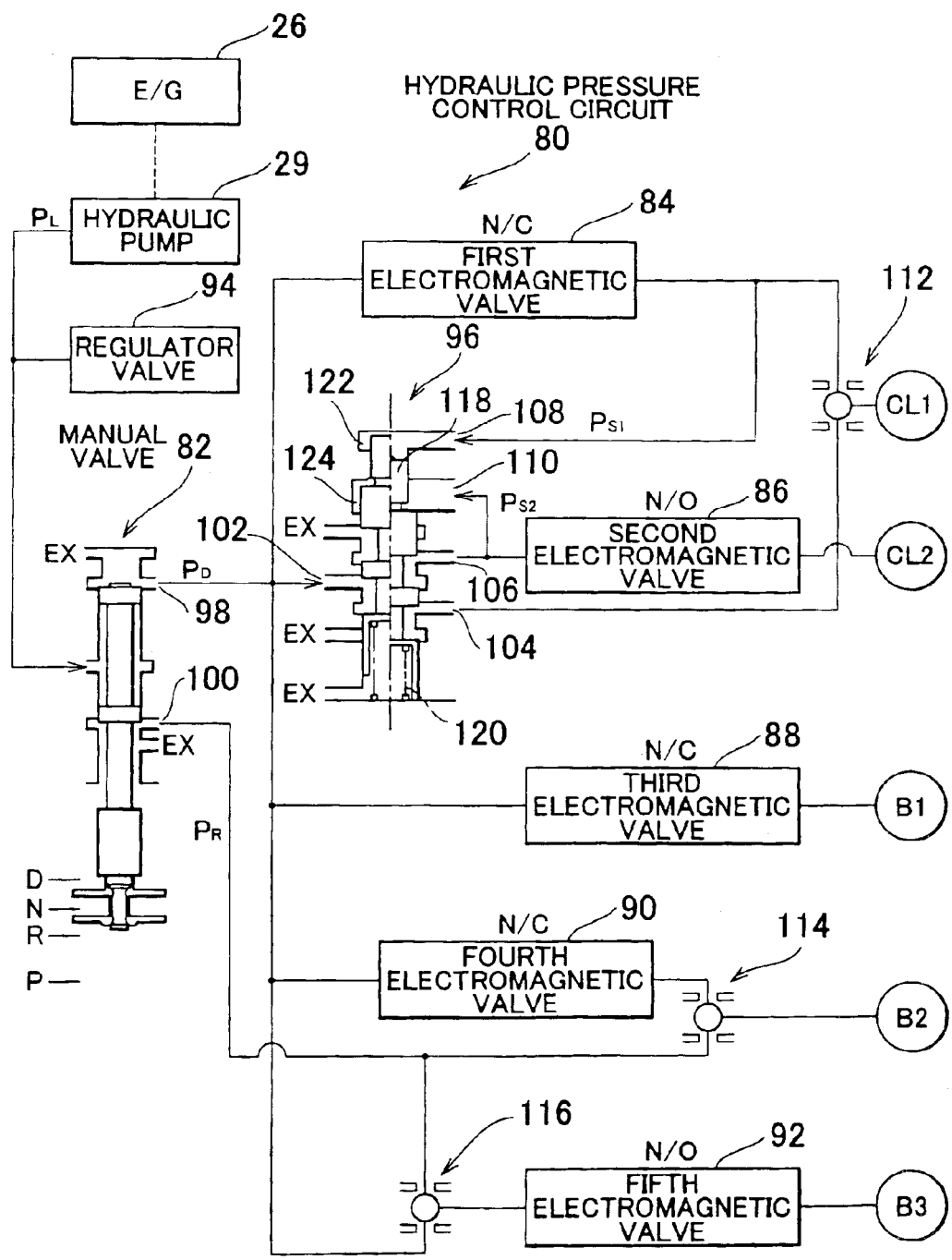
FIG. 4 is a view showing the configuration of the main components of the hydraulic pressure control circuit that controls operation of the automatic transmission shown in FIG. 1.

FIG. 4 is a view showing the configuration of the main components of the hydraulic pressure control circuit 80 that controls the operation of the transmission 10. As shown in the drawing, the hydraulic pressure control circuit 80 includes a first electromagnetic valve 84 for mainly controlling operation of the first clutch CL1, a second electromagnetic valve 86 for mainly controlling operation of the second clutch CL2, a third electromagnetic valve 88 for mainly controlling operation of the first brake B1, a fourth electromagnetic valve 90 for mainly controlling operation of the second brake B2, and a fifth electromagnetic valve 92 for mainly controlling operation of the third brake B3. These electromagnetic control valve devices each have an electromagnetic solenoid SL1 to SL5, respectively, that is controlled by the ECU 70. These electromagnetic solenoids SL1 to SL5 open and close the electromagnetic control valve devices using electromagnetic force. Here, the first electromagnetic valve 84, the third electromagnetic valve 88, and the fourth electromagnetic valve 90 are normally closed (N/C) type electromagnetic check valves which are closed when the electromagnetic solenoids SL1, SL3, and SL4, respectively, are off (i.e., de-energized) and open when the electromagnetic solenoids are on (i.e., energized). The second electromagnetic valve 86 and the fifth electromagnetic valve 92 are normally open (N/O) type electromagnetic check valves which are open when the electromagnetic solenoids SL2 and SL5, respectively, are off (i.e., de-energized) and closed when the electromagnetic solenoids are on (i.e., energized). Further, the hydraulic pressure control circuit 80 is provided with a regulator valve 94 for regulating the pressure of the hydraulic fluid that is supplied. The opening of this regulator valve 94 is adjusted to a size corresponding to the throttle opening amount $\theta_{TH}$ such that the hydraulic fluid fed from the hydraulic pump 29 becomes the necessary and sufficient pressure as the original pressure of the hydraulic friction engaging devices. Also, the first clutch L1, the second brake B2, and the third brake B3 are connected to the hydraulic pressure control circuit 80 via a first shuttle valve 112, a second shuttle valve 114, and a third shuttle valve 116, respectively.

Further, the hydraulic pressure control circuit 80 is provided with a switching valve 96 which switches from a first position shown to the right in FIG. 4 to a second position shown to the left in the same figure. The switching valve 96 switches according to a change in a switching position of the manual valve 82 when the electromagnetic control valve devices, i.e., the first electromagnetic valve 84 to the fifth electromagnetic valve 92, stop working (i.e., fail) due to, for example, a connector, which electrically connects the electromagnetic control valve device and the ECU 70, becoming disconnected for some reason. Preferably only one switching valve 96 is provided in the hydraulic pressure control circuit 80, with that switching valve 96 including a D range hydraulic pressure input port 102 into which D range hydraulic pressure $P_D$ output from a D range hydraulic pressure output port 98 of the manual valve 82 is input, a first output port 104 connected to the first clutch CL1 via the first shuttle valve 112, a second output port 106 connected to the second clutch CL2 via the second electromagnetic valve 86, a first signal pressure input port 108 into which a first signal pressure $P_{S1}$ output from an output port of the first electromagnetic valve 84 is input, and a second signal pressure input port 110 into which a second signal pressure $P_{S2}$ output from the second output port 106 is input. In the drawing, EX indicate a drain port.

The switching valve 96 has a spool valve 118 which is movable between two positions: i) a first position in which the D range hydraulic pressure input port 102 is communicated with the second output port 106 in order to supply D range hydraulic pressure $P_D$ to the second clutch CL2, and in which communication between the D range hydraulic pressure input port 102 and the first output port 104 is interrupted; and ii) a second position in which the D range hydraulic pressure input port 102 is communicated with the first output port 104 in order to supply D range hydraulic pressure $P_D$ to the first clutch CL1, and in which communication between the D range hydraulic pressure input port 102 and the second output port 106 is interrupted. The switching valve 96 is also provided with a spring 120, which urges the spool valve 118 toward the second position, a first control hydraulic fluid chamber 122 into which the first signal pressure $P_{S1}$ is introduced through the first signal pressure input port 108 which applies a force to the spool valve 118 in the direction of the first position against the urging force of the spring 120, and a second control hydraulic fluid chamber 124 into which the second signal pressure $P_{S2}$ is introduced through the second signal pressure input port 110 which applies a force to the spool valve 118 in the direction of the first position against the urging force of the spring 120. According to this construction, the switching valve 96 is moved into the second position when there is no output from either the first signal pressure $P_{S1}$ or the second signal pressure $P_{S2}$, and into the first position when there is output from the first signal pressure $P_{S1}$ or the second signal pressure $P_{S2}$.

If the electromagnetic control valve device fails, the second clutch CL2 and the third brake B3, which are controlled by the N/O type second electromagnetic valve 86 and fifth electromagnetic valve 92, respectively, are first engaged, such that the fifth speed "5th", which is a first predetermined speed, is established, as shown in FIG. 2. When the manual valve 82 is put in the "D" position, at least one of the first electromagnetic valve 84 and the second electromagnetic valve 86 become on such that hydraulic pressure is supplied to engage at least one of the first clutch CL1 and the second clutch CL2. As a result, the switching valve 96, which is always in the first position, is kept in the first position by introducing the second signal pressure $P_{S2}$ into the second control hydraulic fluid chamber 124 after a failure has occurred. Then, after the position of the manual valve 82 has been changed from the "D" position to another position, e.g., the "N", "R", or "P" position, by an operation by the driver, such as when the vehicle has been temporarily stopped, when the position of the manual valve 82 is switched into the "D" position again, the output of the D range hydraulic pressure $P_D$, which is hydraulic pressure to drive the vehicle forward, is suspended such that the second signal pressure $P_{S2}$ stops being input into the second control hydraulic fluid chamber 124. As a result, the switching valve 96 moves into the second position and the hydraulic fluid path switches. Accordingly, the D range hydraulic pressure $P_D$ is output to the hydraulic fluid path with the switching valve 96 being in the second position, thus engaging the first clutch CL1 and the third brake B3. As a result, the third speed "3rd", which is a second predetermined speed, is established, as shown in FIG. 2. That is, according to the hydraulic pressure control circuit 80, when the electromagnetic control valve device stops working while driving, the transmission 10 is first put into the fifth speed "5th" by keeping the switching valve 96 in the first position. As a result, for example, sudden engine braking will not occur even when the vehicle is running at relatively high speeds. Further, by switching the position of the manual valve 82 back into the "D" position after it has been changed to another position when running at low speeds or when the vehicle takes off after a stop, or the like, the switching valve 96 switches from the first position to the second position and the third speed "3rd", which has a larger gear ratio than that of the fifth speed "5th", is established, thus ensuring the driving power necessary for running at low speeds or for take off again.

Thus, according to this exemplary embodiment, the first electromagnetic valve 84 to the fifth electromagnetic valve 92 are electromagnetic control valve devices that establish the first speed "1st" to the sixth speed "6th", including fifth speed "5th" which is the first predetermined speed and third speed "3rd" which is the second predetermined speed, by changing the combination of the plurality of hydraulic friction engaging devices operated. In the event that these first to the fifth electromagnetic valves 84 to 92 fail (i.e., stop working), the switching valve 96 is mechanically switched from the first position to the second position according to the change in the position of the manual valve 82. By providing the switching valve 96 which operates the hydraulic friction engaging elements in a combination to establish the fifth speed "5th" when in the first position, and in a combination to establish the third speed "3rd" when in the second position, in the event of failure while driving, the fifth speed "5th" is first established to enable the vehicle to continue running. Then when the position of the manual valve 82 is changed by an operation by the driver when the vehicle is stopped or the like, the switching valve 96 switches the vehicle into the third speed "3rd", which has a larger gear ratio than the fifth speed "5th", to ensure the driving force required to take off again. That is, it is possible to provide the hydraulic pressure control circuit 80 of the transmission 10 which enables the vehicle to run appropriately when a relatively large driving force is required while the failsafe means is functioning.

Further, because the switching valve 96 is switched from the first position to the second position when output of the D range hydraulic pressure $P_D$, which is the hydraulic pressure for driving, is interrupted due to a change in the position of the manual valve 82, switching the position of the manual valve 82 into the "D" position again after it had been switched to another position results in the transmission 10 shifting from the fifth speed "5th" to the third speed "3rd", where appropriate running of the vehicle is possible.

Also, the hydraulic friction engaging devices include the first clutch CL1, the second clutch CL2, the first brake B1, the second brake B2, and the third brake B3. The first speed "5th", which is the first predetermined speed, is established by engaging the second clutch CL2 and the third brake B3 in combination. The third speed "3rd", which is the second predetermined speed, is established by engaging of the first clutch CL1 and the third brake B3 in combination. The plurality of electromagnetic control valve devices include the first electromagnetic valve 84 which serves as the first clutch control valve, the N/O type second electromagnetic valve 86 which serves as the second clutch control valve, the N/C type third electromagnetic valve 88 which serves as the first brake control valve, the N/C type fourth electromagnetic valve 90 which serves as the second brake control valve, and the N/O type fifth electromagnetic valve 92 which serves as the third brake control valve. The manual valve 28 outputs the D range hydraulic pressure $P_D$ when the shift lever 60 is operated to the "D" position, but does not output hydraulic pressure when the shift lever 60 is operated to the "N" position. The switching valve 96 switches output of the D range hydraulic pressure $P_D$ so as to engage the second clutch CL2 when in the first position, and engage the first clutch CL1 when in the second position. Therefore, if a failure occurs and the plurality of electromagnetic control valve devices stop working, the second clutch CL2 and the third brake B3, which are controlled by the N/O type second electromagnetic valve 86 and fifth electromagnetic valve 92, respectively, are first engaged such that the fifth speed "5th" is established. Then, when the manual valve 82 is again switched into the "D" position after it has been switched, for example, to the "N" position by an operation of the driver when the vehicle is stopped or the like, the switching valve 96 switches the output of the D range hydraulic pressure $P_D$ so as to release the second clutch CL2 while engaging the first clutch CL1, thereby establishing the third speed "3rd".

A second exemplary embodiment of this invention will now be described. In the drawings, portions of the second exemplary embodiment that are the same as those of the first exemplary embodiment will be denoted by like reference numerals, and redundant explanations thereof will be omitted.

Figure 5:
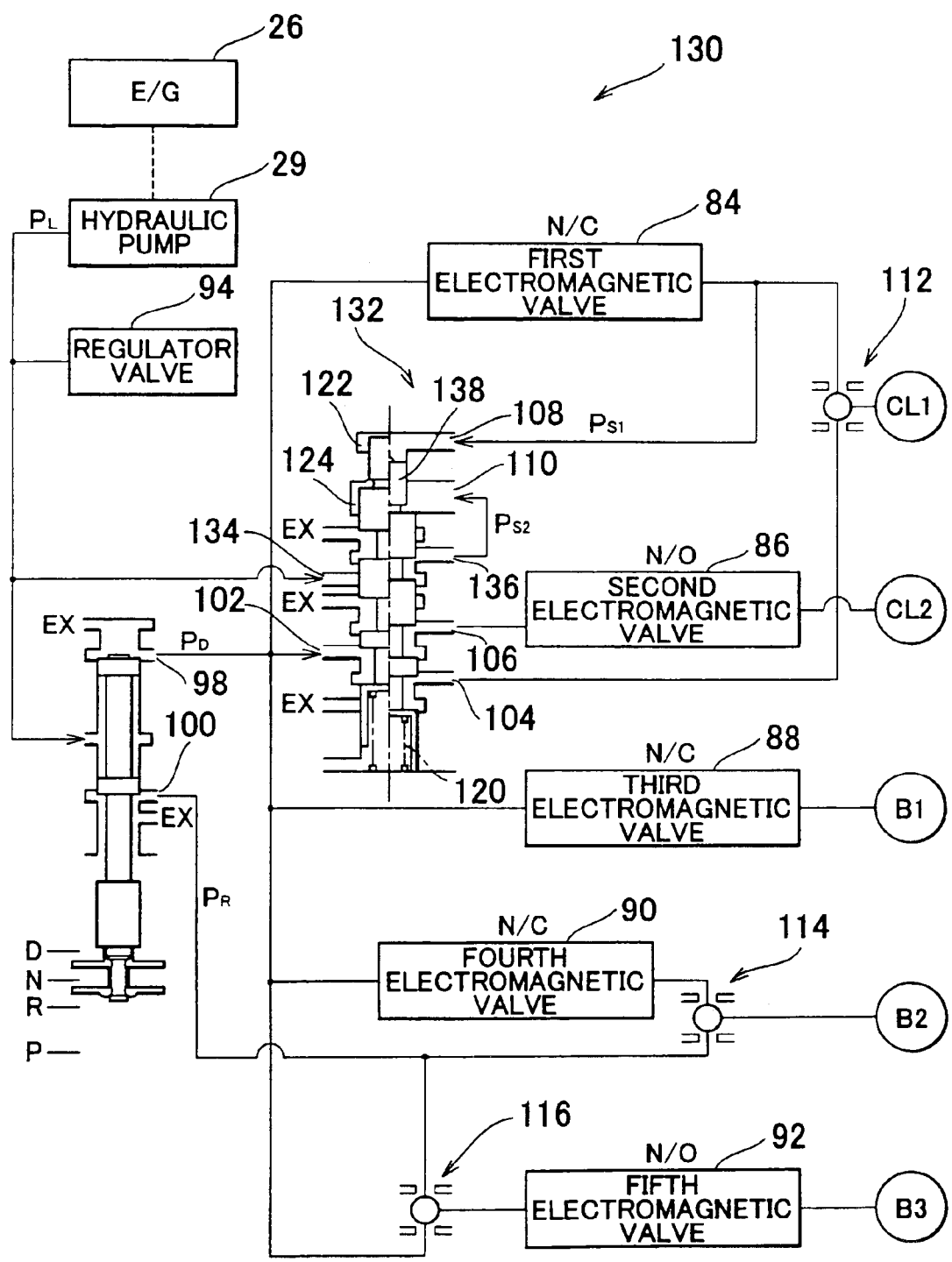
FIG. 5 is a view showing the configuration of the main components of another hydraulic pressure control circuit that controls operation of the automatic transmission shown in FIG. 1.

FIG. 5 is a view showing the configuration of the main components of another hydraulic pressure control circuit 136 that controls the operation of the transmission 10. As shown in the drawing, a hydraulic pressure control circuit 130 includes a switching valve 132 that switches from a first position shown to the right in the drawing to a second position shown to the left in the drawing according to a change in the operating state of the hydraulic pump 29 when the electromagnetic control valve devices, i.e., the first electromagnetic valve 84 to the fifth electromagnetic valve 92, stop working due to, for example, the connector which electrically connects the electromagnetic control valve devices with the ECU 70 becoming disconnected for some reason. Preferably only one switching valve 132 is provided in a hydraulic pressure control circuit 130. In addition to including the D range hydraulic pressure input port 102, the first output port 104, the second output port 106, the first signal pressure input port 108, the second signal pressure input port 110, the spring 120, the first control hydraulic fluid chamber 122, and the second control hydraulic fluid chamber 124, the switching valve 132 also includes a line hydraulic pressure input port 134 into which a line hydraulic pressure $P_L$ is input, and a third output port 136 which outputs that line hydraulic pressure $P_L$ as the second signal pressure $P_{S2}$ to the second control hydraulic fluid chamber 124. The second output port 106 in this switching valve 132 is not connected to the second control hydraulic fluid chamber 124.

The switching valve 132 has a spool valve 138 which is movable between two positions: i) a first position in which the D range hydraulic pressure input port 102 is communicated with the second output port 106 in order to supply D range hydraulic pressure $P_D$ to the second clutch CL2 and the line hydraulic pressure input port 134 is communicated with the third output port 136, and in which communication between the D range hydraulic pressure input port 102 and the first output port 104 is interrupted; and ii) a second position in which the D range hydraulic pressure input port 102 is communicated with the first output port 104 in order to supply D range hydraulic pressure $P_D$ to the first clutch CL1, and in which communication between the D range hydraulic pressure input port 102 and the second output port 106 is interrupted and communication between the line hydraulic pressure input port 134 and the third output port 136 is also interrupted. The switching valve 132 is moved into the second position when there is no output from either the first signal pressure $P_{S1}$ or the second signal pressure $P_{S2}$, and into the first position when there is output from the first signal pressure $P_{S1}$ or the second signal pressure $P_{S2}$.

In the event that the electromagnetic control valve device fails, the second clutch CL2 and the third brake B3, which are controlled by the N/O type second electromagnetic valve 86 and fifth electromagnetic valve 92, respectively, are first engaged, such that the fifth speed "5th", which is a first predetermined speed, is established, as shown in FIG. 2. When the hydraulic pump is working, the line hydraulic pressure $P_L$ input to the line hydraulic pressure input port 134 is supplied to the second control hydraulic fluid chamber 124 from the third output port 136 as the second signal pressure $P_{S2}$. As a result, the switching valve 132, which is always in the first position, is kept in the first position by introducing the second signal pressure $P_{S2}$ into the second control hydraulic fluid chamber 124 after a failure has occurred. Then, when operation of the hydraulic pump 29 is stopped when, for example, the engine 26 is stopped by an operation by the driver, such as when stopping the vehicle, the line hydraulic pressure $P_L$ stops being output. Accordingly, the second signal pressure $P_{S2}$ stops being input to the second hydraulic fluid chamber 124 such that the switching valve 132 moves into the second position, thereby switching the hydraulic fluid path. Then, when the hydraulic pump 29 is restarted, the D range hydraulic pressure $P_D$ is output to the hydraulic fluid path established when the switching valve 132 is in the second position such that the first clutch CL1 and the third brake B3 engage. As a result, the third speed "3rd", which is the second predetermined speed, is established as shown in FIG. 2. That is, according to the hydraulic pressure control circuit 130, when the electromagnetic control valve devices stop working when the vehicle is running forward, the transmission 10 is first shifted into the fifth speed "5th" by keeping the switching valve 132 in the first position. As a result, for example, sudden engine braking will not occur even when the vehicle is running at relatively high speeds. Further, according to a change in the operating state of the hydraulic pump 29 when the vehicle takes off again after having been stopped or the like, the switching valve 132 switches from the first position to the second position and the third speed "3rd", which has a larger gear ratio than that of the fifth speed "5th", is established, thus ensuring the driving power necessary for running at low speeds or for take off again.

Figure 6:
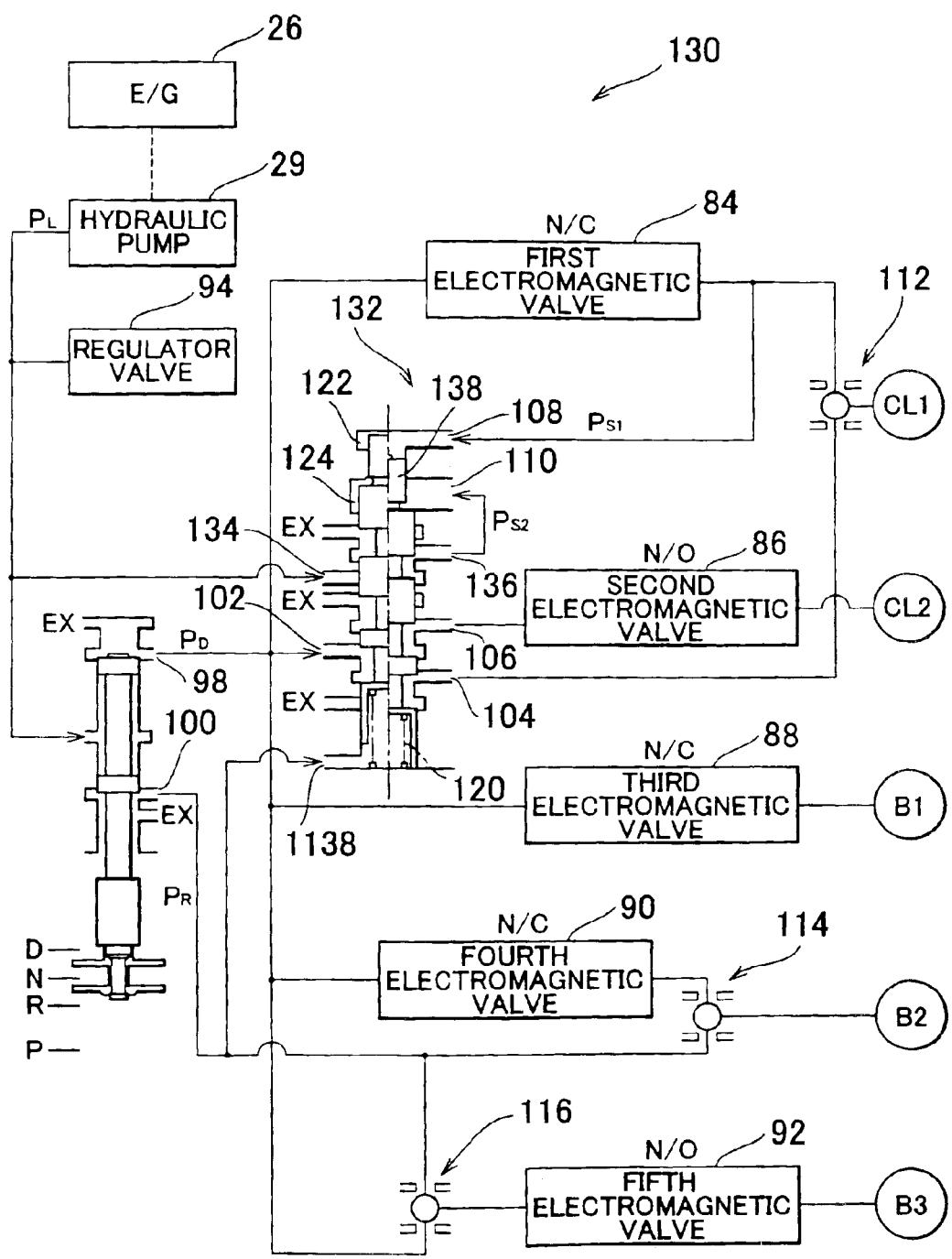
FIG. 6 is a view showing the configuration the main components of still another hydraulic pressure control circuit that controls operation of the automatic transmission shown in FIG. 1.

Even more preferably, the switching valve 132 provided in the hydraulic pressure control circuit 130 is provided with an R range hydraulic pressure input port 1138 into which an R range hydraulic pressure $P_R$ output from the R range hydraulic pressure output port 100 of the manual valve 82 is input, and a third control hydraulic fluid chamber 142, as shown in FIG. 6. Introducing the R range hydraulic pressure $P_R$ into this third control hydraulic fluid chamber 142 cancels out the line pressure $P_L$ introduced into the second control hydraulic fluid chamber 124, such that the spool valve 138 is forced into the second position by the urging force of the spring 120. According to this construction, the switching valve 132 can be switched from the first position to the second position by switching the manual valve 82 into the "D" position again after it has been switched into the "R" position, without stopping the hydraulic pump 29.

Thus, according to the exemplary embodiment, the first electromagnetic valve 84 to the fifth electromagnetic valve 92 are electromagnetic control valve devices that establish the first speed "1st" to the sixth speed "6th", including fifth speed "5th" which is the first predetermined speed and third speed "3rd" which is the second predetermined speed, by changing the combination of the plurality of hydraulic friction engaging devices operated. In the event that the first to the fifth electromagnetic valves 84 to 92 fail (i.e., stop working), the switching valve 132 is mechanically switched from the first position to the second position according to the change in the operating state of the hydraulic pump 29. By providing this switching valve 132, which operates the hydraulic friction engaging elements in a combination to establish the fifth speed "5th" when in the first position, and in a combination to establish the third speed "3rd" when in the second position, in the event of failure while driving, the fifth speed "5th" is first established to enable the vehicle to continue running. Then, when operation of the hydraulic pump 29 is stopped due to, for example, operation of the engine 26 being stopped, such as when the vehicle is stopped, the switching valve 132 shifts the transmission 10 into the third speed "3rd", which has a larger gear ratio than the fifth speed "5th", to ensure the driving force required to take off again. That is, it is possible to provide the hydraulic pressure control circuit 180 of the transmission 10 which enables the vehicle to run appropriately when a relatively large driving force is required while the failsafe means is functioning.

Further, because the switching valve 132 is switched from the first position to the second position when the line hydraulic pressure $P_L$ stops being output due to the operation of the hydraulic pump 29 stopping, the transmission 10 is shifted from the fifth speed "5th" into the third speed "3rd" by restarting the engine 26 after it has been stopped, for example, when the vehicle has been stopped or the like. As a result, appropriate running of the vehicle in the third speed "3rd" is made possible.

Also, because the switching valve 132 is also switched from the first position to the second position according to a change in the switching position of the manual valve 82, the transmission 10 can also be shifted from the fifth speed "5th" to the third speed "3rd", where appropriate running of the vehicle is possible, by switching the manual valve 82 back into the "D" position after it had been switched to another position, for example, when the vehicle was stopped or the like.

Further, because the switching valve 132 is switched from the first position to the second position when the R range hydraulic pressure $P_R$, which is the hydraulic pressure for driving the vehicle in reverse, stops being output due to a change in the switching position of the manual valve 82, the transmission 10 can be shifted from the fifth speed "5th" to the third speed "3rd", where appropriate running of the vehicle is possible, by switching the manual valve 82 into the "D" position again after it had been switched to the "R" position when the vehicle was stopped or the like.

Although the invention has been described in herein with reference to specific embodiments and drawings, the invention is not limited to these embodiments but may be implemented with further variations and modifications.

For example, in the foregoing exemplary embodiments, the first predetermined speed is the fifth speed "5th" and the second predetermined speed is the third speed "3rd". The invention is of course not limited to this. The first predetermined speed and the second predetermined speed may be selected appropriately according to the type of vehicle.

Also in the foregoing exemplary embodiments, the transmission 10 includes the first clutch CL1, the second clutch CL2, and the first to third brakes B1 to B3. Not all of these need be provided however. Further, another hydraulic friction engaging device may also be provided. In addition, the transmission 10 in the exemplary embodiments is such that the fifth speed "5th" is established by applying the second clutch CL2 and the third brake B3 in combination, and the third speed "3rd" is established by applying the first clutch CL1 and the third brake B3 in combination. Alternatively, however, a combination of devices, from among the plurality of hydraulic friction engaging devices, to establish the first predetermined speed and the second predetermined speed may be set appropriately according to the type of vehicle.

Further, although not mentioned in either of the foregoing exemplary embodiments, a variety of electromagnetic control valve devices, such as a solenoid valve, a linear solenoid valve, a duty solenoid valve or the like, may be used as necessary as the first to the fifth electromagnetic valves 84 to 92.

Moreover, in the exemplary embodiments, the hydraulic pressure control circuits 80 and 130 each switch the combination of the plurality of hydraulic friction engaging devices being operated by a single switching valve 96 and 132, respectively. Alternatively, however, the hydraulic circuit may be designed such that the operation of multiple hydraulic friction engaging devices is controlled by a plurality of switching valves provided in the hydraulic circuit.

Although not illustrated, many other modifications and variations therein will readily occur to those skilled in the art. Accordingly, all such variations and modifications are included within the intended scope of the invention.

What is claimed is:

1. A hydraulic pressure control apparatus for an automatic transmission for a vehicle, comprising:
a plurality of hydraulic friction engaging devices which are selectively operated to selectively establish a speed of the automatic transmission;
a plurality of electromagnetic control valve devices which change a combination of the plurality of hydraulic friction engaging devices being operated so as to selectively establish a first predetermined speed and a second predetermined speed;
a driving state switching valve switched by an operation by a driver, which switches a driving state of the automatic transmission by supplying a hydraulic fluid fed under pressure from a hydraulic pump to a predetermined hydraulic fluid path; and
a switching valve which is switched from a first position to a second position according to a change in a position of the driving state switching valve when all of the plurality of electromagnetic control valve devices stop working, the switching valve operating the hydraulic friction engaging devices in a combination to establish the first predetermined speed when in the first position, and in a combination to establish the second predetermined speed when in the second position.

2. The apparatus according to claim 1, wherein the switching valve is switched from the first position to the second position when hydraulic pressure for driving the vehicle forward stops being output due to a change in the position of the driving state switching valve.

3. The apparatus according to claim 1, wherein the switching valve is switched from the first position to the second position when hydraulic pressure for driving the vehicle in reverse is output due to a change in the position of the driving state switching valve.

4. The apparatus according to claim 1, wherein the hydraulic friction engaging devices include a first clutch, a second clutch, a first brake, a second brake, and a third brake; the first predetermined speed is established by engaging the second clutch and the third brake in combination, and the second predetermined speed is established by engaging the first clutch and the third brake in combination; the plurality of electromagnetic control valve devices include a normally closed type first clutch control valve, a normally open type second clutch control valve, a normally closed type first brake control valve, a normally closed type second brake control valve, and a normally open type third brake control valve; the driving state switching valve prohibits output of hydraulic pressure when a shift lever is shifted to an N position and allows the output of a D range hydraulic pressure when the shift lever is shifted to a D position; and the switching valve switches the output of the D range hydraulic pressure so as to engage the second clutch when in the first position, and so as to engage the first clutch when in the second position.

5. A hydraulic pressure control apparatus for an automatic transmission for a vehicle, comprising:
a plurality of hydraulic friction engaging devices which are selectively operated to selectively establish a speed of the automatic transmission;
a plurality of electromagnetic control valve devices which change a combination of the plurality of hydraulic friction engaging devices being operated so as to selectively establish a first predetermined speed and a second predetermined speed by;
a driving state switching valve which switches a driving state of the automatic transmission by supplying an hydraulic fluid fed under pressure from a hydraulic pump by operation of an engine to a predetermined hydraulic fluid path; and
a switching valve which is switched from a first position to a second position according to a change in an operating state of the hydraulic pump when all of the plurality of electromagnetic control valve devices stop working, the switching valve operating the hydraulic friction engaging devices in a combination to establish the first predetermined speed when in the first position, and in a combination to establish the second predetermined speed when in the second position.

6. The apparatus according to claim 5, wherein the switching valve is switched from the first position to the second position when a line hydraulic pressure stops being output due to operation of the hydraulic pump stopping.

7. The apparatus according to claim 5, wherein the switching valve is switched from the first position to the second position according to a change in the position of the driving state switching valve.

8. The apparatus according to claim 5, wherein the hydraulic friction engaging devices include a first clutch, a second clutch, a first brake, a second brake, and a third brake; the first predetermined speed is established by engaging the second clutch and the third brake in combination, and the second predetermined speed is established by engaging the first clutch and the third brake in combination; the plurality of electromagnetic control valve devices include a normally closed type first clutch control valve, a normally open type second clutch control valve, a normally closed type first brake control valve, a normally closed type second brake control valve, and a normally open type third brake control valve; the driving state switching valve prohibits output of hydraulic pressure when a shift lever is shifted to an N position and allows the output of a D range hydraulic pressure when the shift lever is shifted to a D position; and the switching valve switches the output of the D range hydraulic pressure so as to engage the second clutch when in the first position, and so as to engage the first clutch when in the second position.

9. A hydraulic pressure control method for an automatic transmission for a vehicle, including a plurality of hydraulic friction engaging devices which arc selectively operated to selectively establish a speed of the automatic transmission, a plurality of electromagnetic control valve devices which change a combination of the plurality of hydraulic friction engaging devices being operated so as to selectively establish a first predetermined speed and a second predetermined speed, a driving state switching valve switched by an operation by a driver, which switches a driving state of the automatic transmission by supplying a hydraulic fluid fed under pressure from a hydraulic pump to a predetermined hydraulic fluid path, and a switching valve which operates the hydraulic friction engaging devices, comprising the steps of:

switching the switching valve from a first position to a second position according to a change in a position of the driving state switching valve when all of the plurality of electromagnetic control valve devices stop working; and operating the hydraulic friction engaging devices in a combination to establish the first predetermined speed when in the first position, and in a combination to establish the second predetermined speed when in the second position.

10. The method according to claim 9, wherein the switching valve is switched from the first position to the second position when hydraulic pressure for driving the vehicle forward stops being output due to a change in the position of the driving state switching valve.

11. The method according to claim 9, wherein the switching valve is switched from the first position to the second position when hydraulic pressure for driving the vehicle in reverse is output due to a change in the position of the driving state switching valve.

12. The method according to claim 9, wherein the hydraulic friction engaging devices include a first clutch, a second clutch, a first brake, a second brake, and a third brake; the first predetermined speed is established by engaging the second clutch and the third brake in combination, and the second predetermined speed is established by engaging the first clutch and the third brake in combination; the plurality of electromagnetic control valve devices include a normally closed type first clutch control valve, a normally open type second clutch control valve, a normally closed type first brake control valve, a normally closed type second brake control valve, and a normally open type third brake control valve; the driving state switching valve prohibits output of hydraulic pressure when a shift lever is shifted to an N position and allows the output of a D range hydraulic pressure when the shift lever is shifted to a D position; and the switching valve switches the output of the D range hydraulic pressure so as to engage the second clutch when in the first position, and so as to engage the first clutch when in the second position.

13. A hydraulic pressure control method for an automatic transmission for a vehicle, including a plurality of hydraulic friction engaging devices which are selectively operated to selectively establish a speed of the automatic transmission, a plurality of electromagnetic control valve devices which change a combination of the plurality of hydraulic friction engaging devices being operated so as to selectively establish a first predetermined speed and a second predetermined speed by, a driving state switching valve which switches a driving state of the automatic transmission by supplying an hydraulic fluid fed under pressure from a hydraulic pump by operation of an engine to a predetermined hydraulic fluid path, and a switching valve which operates the hydraulic friction engaging devices, comprising the steps of:

switching the switching valve from a first position to a second position according to a change in an operating state of the hydraulic pump when all of the plurality of electromagnetic control valve devices stop working; and operating the hydraulic friction engaging devices in a combination to establish the first predetermined speed when in the first position, and in a combination to establish the second predetermined speed when in the second position.

14. The method according to claim 13, wherein the switching valve is switched from the first position to the second position when a line hydraulic pressure stops being output due to operation of the hydraulic pump stopping.

15. The method according to claim 13, wherein the switching valve is switched from the first position to the second position according to a change in the position of the driving state switching valve.

16. The method according to claim 13, wherein the hydraulic friction engaging devices include a first clutch, a second clutch, a first brake, a second brake, and a third brake; the first predetermined speed is established by engaging the second clutch and the third brake in combination, and the second predetermined speed is established by engaging the first clutch and the third brake in combination; the plurality of electromagnetic control valve devices include a normally closed type first clutch control valve, a normally open type second clutch control valve, a normally closed type first brake control valve, a normally closed type second brake control valve, and a normally open type third brake control valve; the driving state switching valve prohibits output of hydraulic pressure when a shift lever is shifted to an N position and allows the output of a D range hydraulic pressure when the shift lever is shifted to a D position; and the switching valve switches the output of the D range hydraulic pressure so as to engage the second clutch when in the first position, and so as to engage the first clutch when in the second position.

17. A hydraulic pressure control apparatus for an automatic transmission for a vehicle, comprising:

a plurality of hydraulic friction engaging devices which are adapted to be selectively operated to selectively establish a speed of the automatic transmission;

a plurality of electromagnetic control valve devices which are adapted to change a combination of the plurality of hydraulic friction engaging devices being operated so as to selectively establish a first predetermined speed and a second predetermined speed;

a driving state switching valve adapted to be switched by an operation by a driver, to switch a driving state of the automatic transmission by supplying a hydraulic fluid fed under pressure from a hydraulic pump to a predetermined hydraulic fluid path; and a switching valve adapted to control operation of the hydraulic friction engaging devices in combination to selectively establish at least said first and second predetermined speeds, wherein upon failure of at least one of the electromagnetic control valve devices when the switching valve is in a first position, the switching valve is maintained in the first position to establish said first predetermined speed and wherein, upon the driving state switching valve subsequently changing position during failure of at least one of the electromagnetic control valve devices, the switching valve switches to a second position to establish the second predetermined speed.

18. The apparatus according to claim 17, wherein the switching valve is switched from the first position to the second position when hydraulic pressure for driving the vehicle forward stops being output due to a change in the position of the driving state switching valve.

19. The apparatus according to claim 17, wherein the switching valve is switched from the first position to the second position when hydraulic pressure for driving the vehicle in reverse is output due to a change in the position of the driving state switching valve.

20. The apparatus according to claim 17, wherein the hydraulic friction engaging devices include a first clutch, a second clutch, a first brake, a second brake, and a third brake; the first predetermined speed is established by engaging the second clutch and the third brake in combination, and the second predetermined speed is established by engaging the first clutch and the third brake in combination; the plurality of electromagnetic control valve devices include a normally closed type first clutch control valve, a normally open type second clutch control valve, a normally closed type first brake control valve, a normally closed type second brake control valve, and a normally open type third brake control valve; the driving state switching valve prohibits output of hydraulic pressure when a shift lever is shifted to an N position and allows the output of a D range hydraulic pressure when the shift lever is shifted to a D position; and the switching valve switches the output of the D range hydraulic pressure so as to engage the second clutch when in the first position, and so as to engage the first clutch when in the second position.

21. A hydraulic pressure control apparatus for an automatic transmission for a vehicle, comprising:

a plurality of hydraulic friction engaging devices which are adapted to be selectively operated to selectively establish a speed of the automatic transmission;

a plurality of electromagnetic control valve devices which is adapted to change a combination of the plurality of hydraulic friction engaging devices being operated so as to selectively establish a first predetermined speed and a second predetermined speed by;

a driving state switching valve which is adapted to switch a driving state of the automatic transmission by supplying an hydraulic fluid fed under pressure from a hydraulic pump by operation of an engine to a predetermined hydraulic fluid path; and a switching valve adapted to control operation of the hydraulic friction engaging devices in combination to selectively establish at least said first and second predetermined speeds, wherein upon failure of at least one of the electromagnetic control valve devices when the switching valve is in a first position, the switching valve is maintained in the first position to establish said first predetermined speed and wherein, upon a change in an operating state of the hydraulic pump during failure of at least one of the electromagnetic control valve devices, the switching valve switches to a second position to establish the second predetermined speed.

22. The apparatus according to claim 21, wherein the switching valve is switched from the first position to the second position when a line hydraulic pressure stops being output due to operation of the hydraulic pump stopping.

23. The apparatus according to claim 21, wherein the switching valve is switched from the first position to the second position according to a change in the position of the driving state switching valve.

24. The apparatus according to claim 21, wherein the hydraulic friction engaging devices include a first clutch, a second clutch, a first brake, a second brake, and a third brake; the first predetermined speed is established by engaging the second clutch and the third brake in combination, and the second predetermined speed is established by engaging the first clutch and the third brake in combination; the plurality of electromagnetic control valve devices include a normally closed type first clutch control valve, a normally open type second clutch control valve, a normally closed type first brake control valve, a normally closed type second brake control valve, and a normally open type third brake control valve; the driving state switching valve prohibits output of hydraulic pressure when a shift lever is shifted to an N position and allows the output of a D range hydraulic pressure when the shift lever is shifted to a D position; and the switching valve switches the output of the D range hydraulic pressure so as to engage the second clutch when in the first position, and so as to engage the first clutch when in the second position.

25. A hydraulic pressure control method for an automatic transmission for a vehicle, including a plurality of hydraulic friction engaging devices which are adapted to be selectively operated to selectively establish a speed of the automatic transmission, a plurality of electromagnetic control valve devices which are adapted to change a combination of the plurality of hydraulic friction engaging devices being operated so as to selectively establish a first predetermined speed and a second predetermined speed, a driving state switching valve adapted to be switched by an operation by a driver, to switch a driving state of the automatic transmission by supplying a hydraulic fluid fed under pressure from a hydraulic pump to a predetermined hydraulic fluid path, and a switching valve adapted to operate the hydraulic friction engaging devices, comprising the steps of:

maintaining the switching valve in a first position when the switching valve is in the first position upon failure of at least one of the electromagnetic control valve devices;

switching the switching valve from a first position to a second position upon the driving state switching valve subsequently changing position during failure of at least one of the electromagnetic control valve devices; and operating the hydraulic friction engaging devices in a combination to establish the first predetermined speed when the switching valve is in the first position, and in a combination to establish the second predetermined speed when the switching valve is in the second position.

26. The method according to claim 25, wherein the switching valve is switched from the first position to the second position when hydraulic pressure for driving the vehicle forward stops being output due to a change in the position of the driving state switching valve.

27. The method according to claim 25, wherein the switching valve is switched from the first position to the second position when hydraulic pressure for driving the vehicle in reverse is output due to a change in the position of the driving state switching valve.

28. The method according to claim 25, wherein the hydraulic friction engaging devices include a first clutch, a second clutch, a first brake, a second brake, and a third brake; the first predetermined speed is established by engaging the second clutch and the third brake in combination, and the second predetermined speed is established by engaging the first clutch and the third brake in combination; the plurality of electromagnetic control valve devices include a normally closed type first clutch control valve, a normally open type second clutch control valve, a normally closed type first brake control valve, a normally closed type second brake control valve, and a normally open type third brake control valve; the driving state switching valve prohibits output of hydraulic pressure when a shift lever is shifted to an N position and allows the output of a D range hydraulic pressure when the shift lever is shifted to a D position; and the switching valve switches the output of the D range hydraulic pressure so as to engage the second clutch when in the first position, and so as to engage the first clutch when in the second position.

29. A hydraulic pressure control method for an automatic transmission for a vehicle, including a plurality of hydraulic friction engaging devices which are adapted to be selectively operated to selectively establish a speed of the automatic transmission, a plurality of electromagnetic control valve devices which are adapted to change a combination of the plurality of hydraulic friction engaging devices being operated so as to selectively establish a first predetermined speed and a second predetermined speed by, a driving state switching valve adapted to switch a driving state of the automatic transmission by supplying an hydraulic fluid fed under pressure from a hydraulic pump by operation of an engine to a predetermined hydraulic fluid path, and a switching valve adapted to operate the hydraulic friction engaging devices, comprising the steps of:

maintaining the switching valve in a first position when the switching valve is in the first position upon failure of at least one of the electromagnetic control valve devices;

switching the switching valve from a first position to a second position upon a change in an operating state of the hydraulic pump during failure of at least one of the electromagnetic control valve devices during failure of at least one of the electromagnetic control valve devices; and operating the hydraulic friction engaging devices in a combination to establish the first predetermined speed when the switching valve is in the first position, and in a combination to establish the second predetermined speed when the switching valve is in the second position.

30. The method according to claim 29, wherein the switching valve is switched from the first position to the second position when a line hydraulic pressure stops being output due to operation of the hydraulic pump stopping.

31. The method according to claim 29, wherein the switching valve is switched from the first position to the second position according to a change in the position of the driving state switching valve.

32. The method according to claim 29, wherein the hydraulic friction engaging devices include a first clutch, a second clutch, a first brake, a second brake, and a third brake; the first predetermined speed is established by engaging the second clutch and the third brake in combination, and the second predetermined speed is established by engaging the first clutch and the third brake in combination; the plurality of electromagnetic control valve devices include a normally closed type first clutch control valve, a normally open type second clutch control valve, a normally closed type first brake control valve, a normally closed type second brake control valve, and a normally open type third brake control valve; the driving state switching valve prohibits output of hydraulic pressure when a shift lever is shifted to an N position and allows the output of a D range hydraulic pressure when the shift lever is shifted to a D position; and the switching valve switches the output of the D range hydraulic pressure so as to engage the second clutch when in the first position, and so as to engage the first clutch when in the second position.

* * * * *